United States Patent Office 3,446,220
Patented May 27, 1969

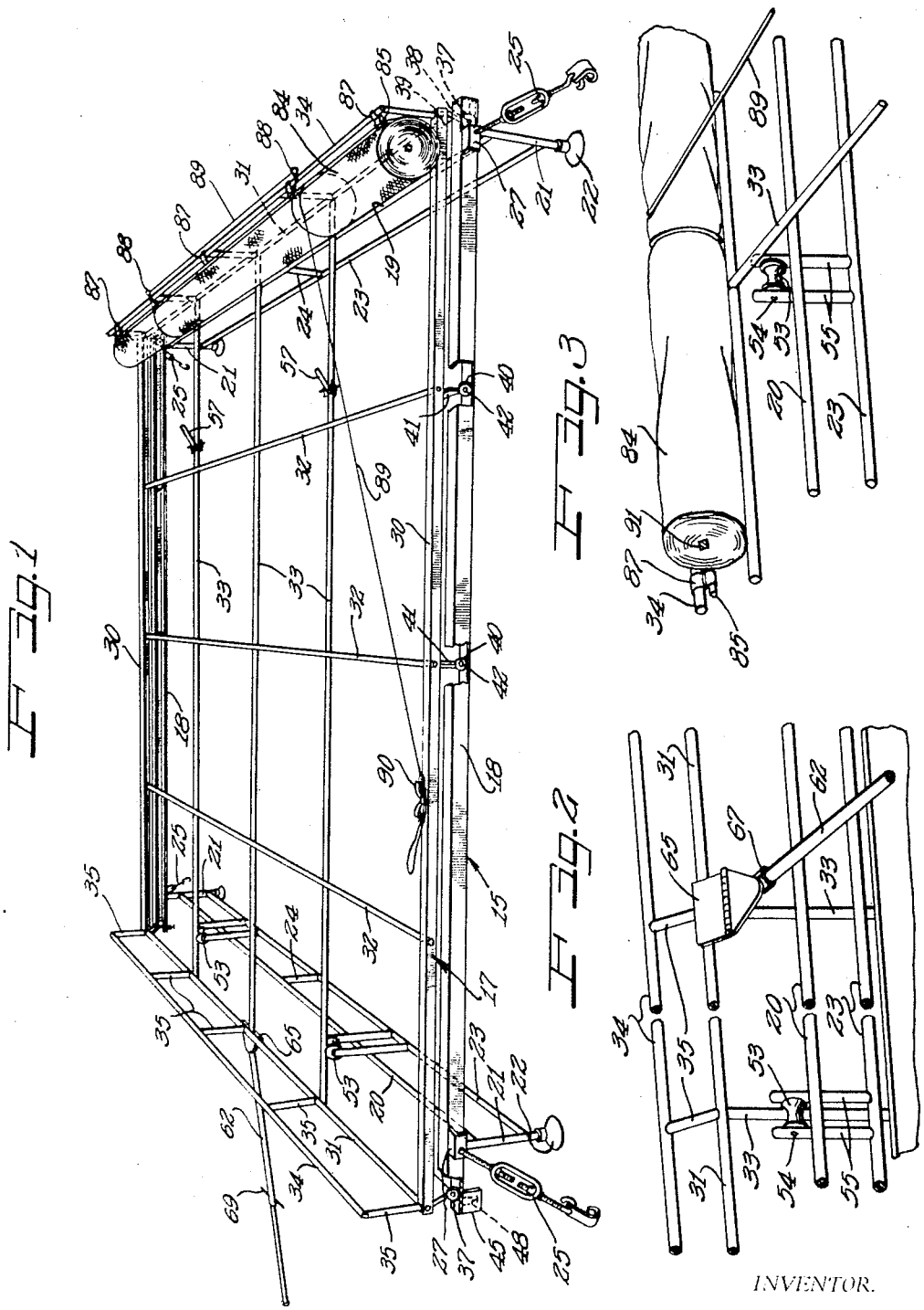

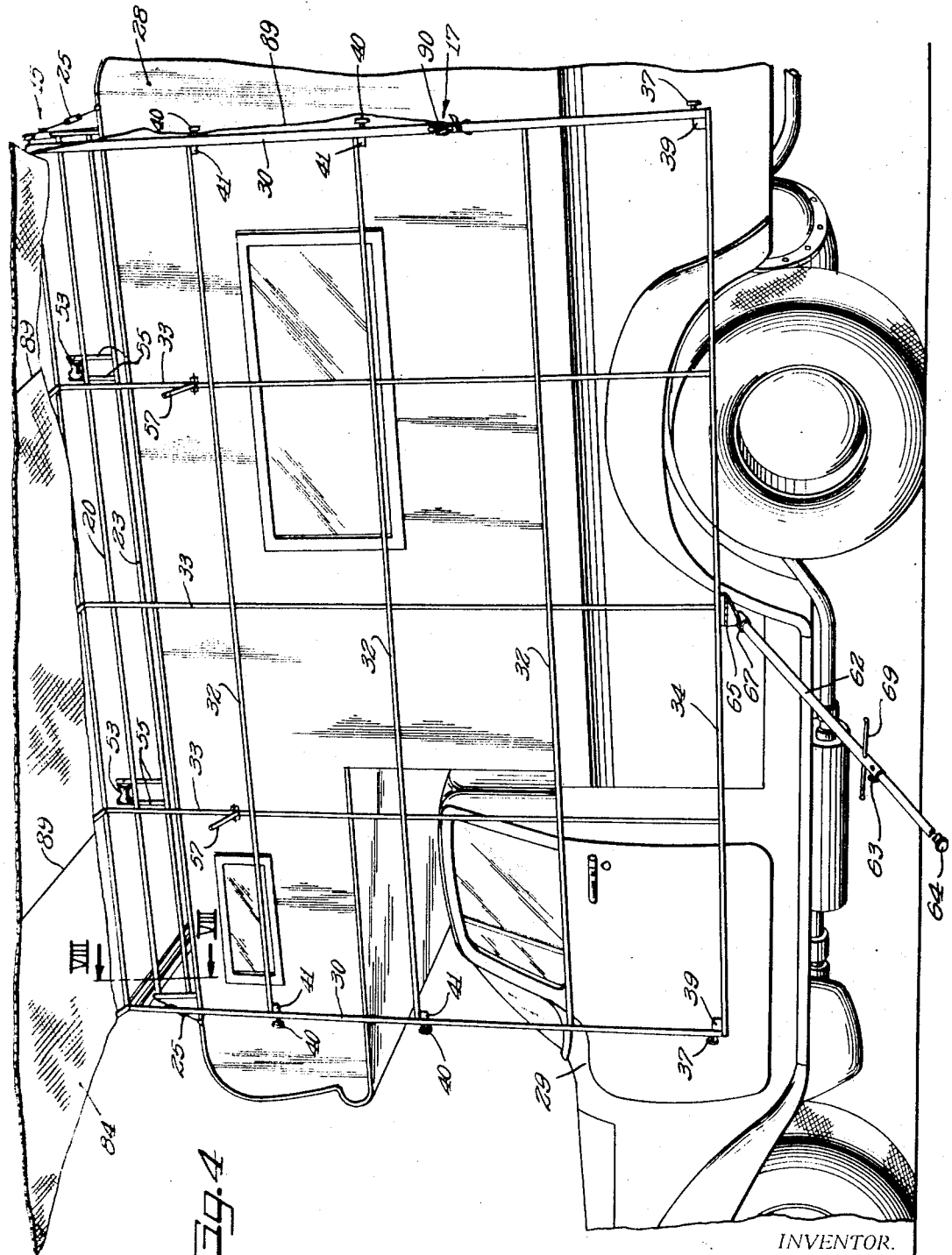

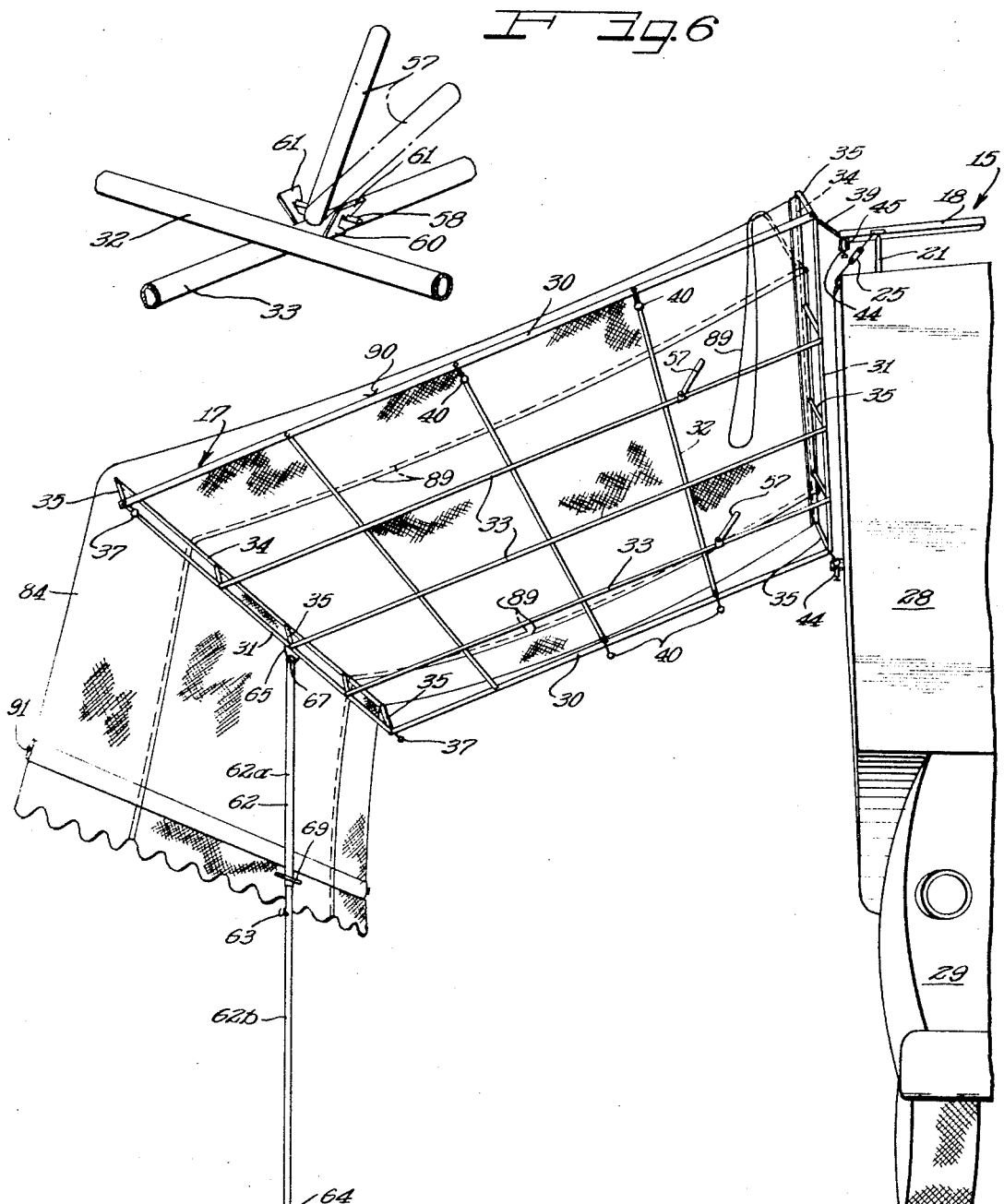

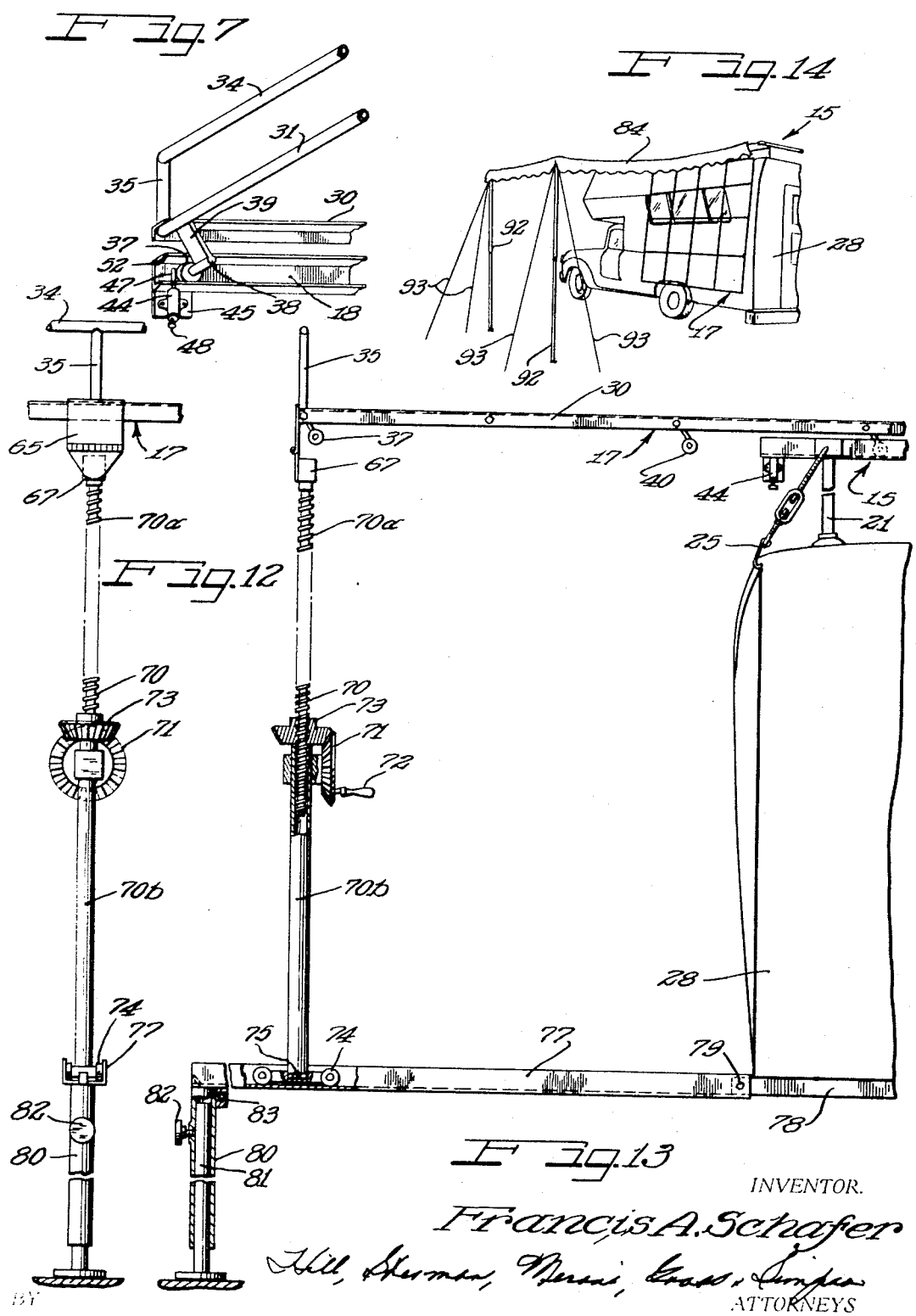

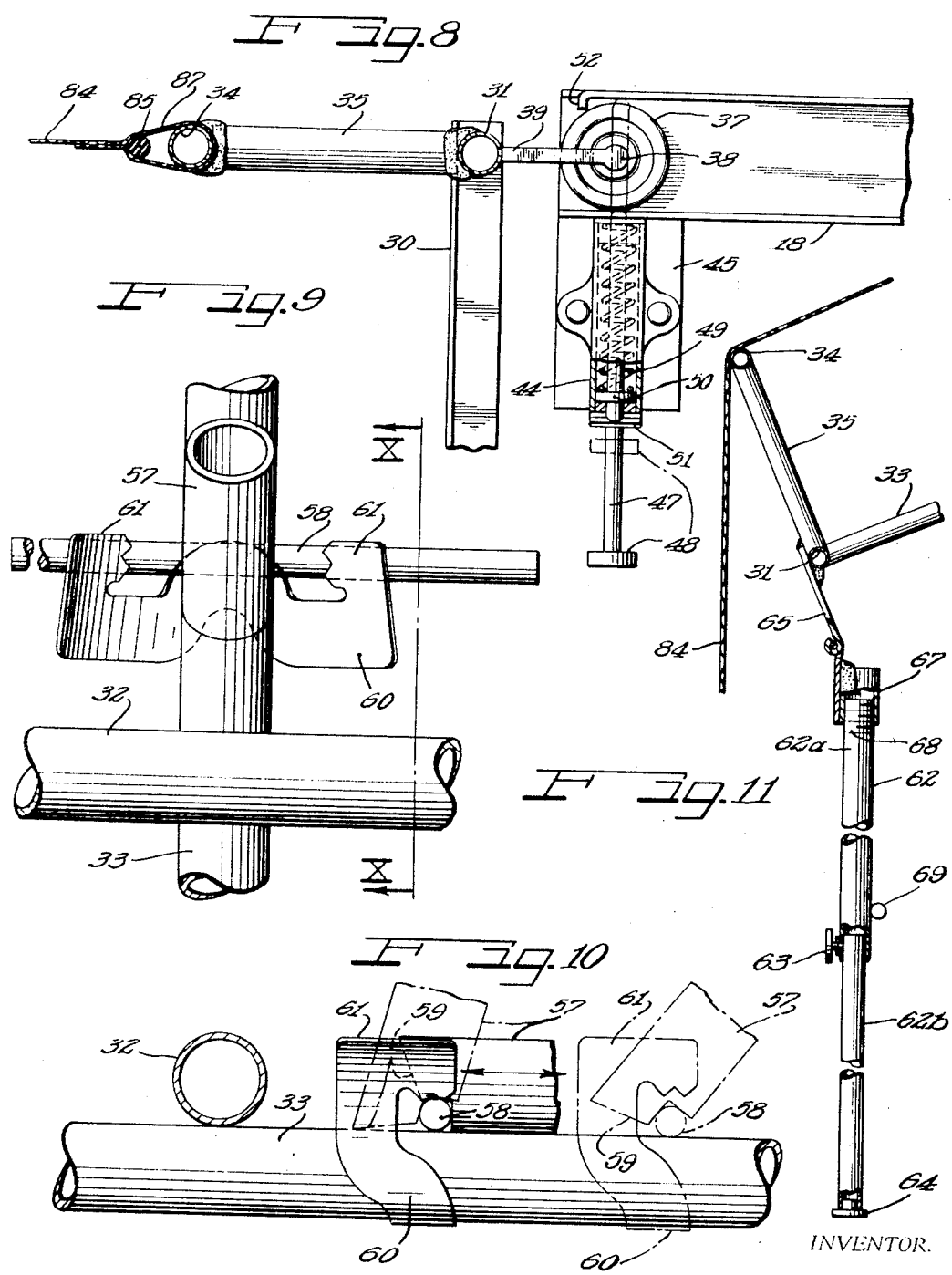

3,446,220
READILY ACCESSIBLE ROOFTOP CARRIER
Francis A. Schafer, 2916 Riverside Drive,
McHenry, Ill. 60050
Filed Feb. 21, 1967, Ser. No. 617,680
Int. Cl. E04f *10/06*
U.S. Cl. 135—5
15 Claims

ABSTRACT OF THE DISCLOSURE

A carrier which is especially constructed for mounting on the roof of a mobile house trailer or camper comprises a supporting frame having a track by which an article-carrying frame is movable on wheels to be swung between a horizontal top position and a downwardly hanging position at one side of the vehicle to facilitate loading and unloading. On the carrying frame is a roll-up awning which may protectively cover articles on the carrier, or serve as an awning or canopy alongside the vehicle when the carrying frame is fully or partially drawn out on its track.

---

This invention relates to a new and improved rooftop carrier for vehicles, and more particularly concerns such a carrier which is especially constructed and arranged to be mounted on a mobile trailer or camper.

Many and varied vehicle rooftop carriers have been heretofore proposed for mounting on the roofs of automobiles. These usually comprise a single frame which is detachably secured to the automobile top and is readily accessible without much trouble by a person standing on the ground or at the most on a relatively low step-like object. However, mobile house-type trailers or campers are built with inside head room sufficient to enable persons to stand up therein, and the roofs are therefore substantially higher than a person standing alongside the vehicle. Yet these roofs are available for carrying articles. While conventional automobile roof top luggage carriers might be placed upon these roofs and reached by way of a ladder, that is a very inconvenient expedient, and entails the not inconsiderable hazards attendant upon the use of a ladder for any reason.

It is, accordingly, an important object of the present invention to provide a novel roof top carrier affording a carrying rack which can be conveniently moved between a horizontal top position and a downwardly swung access position relative to the vehicle on which mounted.

Another object of the invention is to provide a novel rooftop carrier comprising a rack which is track mounted so that it can be moved with minimum effort between an overside access position and a horizontal top position.

Another object of the invention is to provide an improved rooftop carrier having novel means for manipulating the same between a horizontal rooftop position and a downwardly swung access position.

Still another object of the invention is to provide a novel roof top carrier for vehicles which will serve also as a canopy alongside the vehicle.

A still further object of the invention is to provide a novel rooftop carrier of the character indicated which carriers an awning adapted to be erected when the carrier rack is swung down alongside the associated vehicle.

A yet further object of the invention is to provide improved means in a rooftop carrier for anchoring objects to be carried thereon.

Other objects, features and advantages of the present invention will be readily apparent from the following detailed description of certain preferred embodiments thereof taken in conjunction with the accompanying drawings, in which:

FIGURE 1 is a perspective view, partially broken away and in section, of a rooftop carrier embodying features of the invention;

FIGURE 2 is an enlarged fragmental detail view looking upwardly toward the front end of the carrier while in horizontal position;

FIGURE 3 is a fragmentary upward and rearward view toward a rear portion of the rack and the rolled up awning after the rack has been fully drawn out from the supporting frame;

FIGURE 4 is a side elevational view of a camper having the carrier mounted thereon and with the rack in the swung down access position;

FIGURE 5 is a perspective view showing the rack in use as a canopy;

FIGURE 6 is an enlarged fragmentary sectional elevational detail view taken substantially along the line VI—VI of FIG. 1;

FIGURE 7 is a fragmentary sectional elevational detail view taken substantially along the line VII—VII of FIG. 1;

FIGURE 8 is an enlarged fragmentary sectional elevational detail view taken substantially along the line VIII—VIII of FIG. 4;

FIGURE 9 is a top plan view of the detail structure shown in FIG. 6;

FIGURE 10 is a side elevational sectional detail view taken substantially along the line X—X of FIG. 9;

FIGURE 11 is a fragmental sectional elevational detail view taken substantially along the line XI—XI of FIG. 5;

FIGURE 12 is a fragmentary front elevational view showing a modified manipulating device for facilitating movement of the rack of the carrier between its horizontal and swung-down positions;

FIGURE 13 is a side elevational view of the device of FIG. 12; and

FIGURE 14 is a perspective view showing the awning member itself erected as a canopy with the rack of the carrier swung down.

According to the principles of the present invention the rooftop carrier comprises (FIG. 1) a supporting frame 15 supporting in relatively shiftable relation thereto an article-carrying frame rack 17. Both of the frames are desirably of quadrangular outline in plan and of about the same total area in size. Each of the frames 15 and 17 is constructed of as lightweight as practicable consistent with adequate rigidity and load-carrying capability for the purposes intended.

Pursuant to the invention, the base frame 15 has a pair of substantially identical, oppositely complementary, spaced, parallel, coextensive side bars 18, joined together at one of their ends by a cross bar 19, and adjacent to but spaced a limited distance from their opposite ends by a cross bar 20. For mounting the base frame 15 on a vehicle roof respective legs extend downwardly from adjacent to each of the opposite ends of the side bars 18 and have rooftop engaging suction cups 22 on their lower ends. For stabilizing the legs 21, a bar 23 is rigidly connected to and extends between each pair of the legs 21 across the respective opposite ends of the frame. For reinforcing, one or more vertical connecting bars 24 are provided between the bars 20 and 23. To fasten the base frame 15 to the vehicle, means comprising conventional flexibility connected turnbuckle gutter clamps 25 are secured to the opposite end portions of the side bars 18, through respective rigid anchoring flange lugs 27 thereon. Through this arrangement, the base frame 15 is adapted to be mounted on the rooftop of a camper 28 (FIGS. 4 and 6) of the kind mounted on a panel truck 29, and with the gutter clamps 25 securing the base frame in place with those coextensive ends of the side bars 18 which project a limited distance beyond the legs 21 extending into overhanging relation to one side of the camper which, together with the supporting truck will be referred to hereinafter as the vehicle. If preferred, however, the arrangement may be such that the projecting end portions of the side bars 18 extend over the rear end of the vehicle when that would best suit the convenience of the user.

A suitable rugged construction of the article-carrying rack 17 comprises a pair of spaced parallel coextensive similar side bars 30, which are desirably of about the same length as the side bars 18. Rigidly connecting the opposite ends of the side bars 30 are respective end bars 31. At uniformly spaced intervals between and parallel to the end bars 31 are cross bars 32. Rigidly connecting the end bars 31 are frame bars 33 extending parallel to the side bars 30 in supporting underlying relation to the cross bars 32, and comprising three of the bars 33, one of which extends medially and the other two of which extend along lines midway between the center bar 33 and the respective opposite side bars 30. Upstanding on the perimeter of the rack 17 are railing means which may extend about the entire perimeter of the rack, but may, as shown, comprise merely front and rear railing sections including a horizontal bar 34 rigidly connected to the end portions of the side bars 30 and to the end cross bars 31 by means of baluster bars 35, those intermediate the ends of the bars 31 being desirably aligned with the ends of the bars 33. Guided shiftable support of the carrying rack 17 on the base frame 15 is through the medium of sets of rollers engaging the side bars 18 of the base frame as tracks. To this end, the base frame side bars 18 are of inwardly opening channel shape. Adjacent to each opposite end of the carrying rack 17 is operatively connected a supporting roller 37, at each side of the rack, arranged to run in the track provided by the associated side frame bar 18 and journaled on a suitable pintle 38 (FIGS. 7 and 8) rigid on the lower end of a bracket 39 affixed to respectively the front and rear frame cross bars 31. At suitable intervals longitudinally of the side bars 30, additional rollers 40 are provided, preferably aligned with the rearmost two of the cross bars 32 to which such rollers are connected through the medium of rigid downwardly extending respective brackets 41 carrying rigid outwardly extending pintles 42 on which the rollers are rotatably mounted.

Means are provided at the opposite ends of the tracks afforded by the base frame side bars 18 for maintaining the carrying rack 17 in a horizontal carrying position aligned with the base frame 15. Herein this comprises stop and releasable latch means comprising respective stop lugs 43 on the rear ends of the frame bars 10 engageable by the rear rollers 37 and retaining them against running out of the track (FIG. 1). At the front end of the frame assembly, respective releasable stop latches 44 mounted on depending brackets 45 on the front end portions of the side frame bars 18 have respective stop plungers 47 (FIG. 7) which project upwardly into the track in front of the front end rollers 37 to prevent running out of the frame from the horizontal carrying position until the plungers 47 are released. Conveniently, the latch devices 44 are of the type in which the plungers 47 can be moved into latching stop position simply by pushing upwardly on respective lower end head flanges 48 thereon in opposition to a biasing spring 49 (FIG. 8) of the coil compression type normally thrusting downwardly on a fixed collar flange 50 on the plunger, with a rockably mounted friction clutch plate 51 about the plunger at the lower end of the barrel of the device firmly retaining the plunger 47 in its upwardly projecting latch stop position automatically when the plunger is urged upwardly. Release of the plunger from its stop latching position is then readily effected by pressing upwardly on the downwardly canted lip of the clutch plate 51 to declutch the plunger pin so that the spring 49 snaps it downwardly to free the track of the associated bar 18 for outward riding displacement of the carrying rack 17. Such outward displacement of the carrying rack may continue until the rearmost rollers 37 reach the latch-supporting ends of the side bars 18 and are stopped by respective suitable fixed stops 52 which may comprise bent down respective lug flanges from the upper flange of the respective frame bar 18. For this purpose, all of the other rollers are of sufficiently smaller diameter than the rear rollers 37 to escape the stops 52 freely, while the rear rollers 37 are of sufficiently larger diameter to prevent their escape past these stops. As the rear rollers 37 come to a stop against the stops 52, they serve as hinge journals for the rear end of the carrying rack 17, enabling this rack to be freely swung between a horizontal an da downwardly hanging overside loading position relative to the associated vehicle, as shown in FIGURES 4, 8 and 14.

Running of the carrying frame 17 into and out of its horizontal registration with the supporting base frame 15 is facilitated by anti-friction supporting means operative under the carrying frame spaced from its sides and desirably carried by the front portion of the base frame 15, and more particularly the front frame structure thereof provided by the cross bars 20 and 23 at that location. In a desirable construction such means comprise suitable grooved anti-friction rollers 53 (FIGS. 1–4), each of which is supported on an axle 54 mounted on and between a pair of upstanding bracket bars 55 rigid with and projecting upwardly from the vertically aligned bars 20 and 23. In this instance two of the supporting rollers 53 are shown, each of which is supportingly engaged by one of the longitudinal frame bars 33, desirably those located between the side bars 30 and the center one of the longitudinal bars 33 to cooperate with the track-engaging rollers of the carrying frame in providing efficient load support therefor, espcially when loaded with various atricles of luggage which may imposed some bending stresses on the frame. In addition, of course, running of the carrying frame 17 into and out of its horizontal position of registration with the base frame 15 is greatly facilitated, especially while the front rollers 37 are out of their track.

Although straps, cords and other desirable tie-down and luggage securing devices may be employed, as desired, for retaining articles on the carrying rack 17, convenient means to hang in place articles on the rack when the carrying rack is in a pendant position, at least one, and preferably a plurality of pegs 57 are provided thereon. Each of these pegs comprises a suitable length of rod stock, which may be tubular piece of pipe on the order of the tubular bar stock from which various of the bars of the frames, including the bars 33 and 32 are constructed. Suitable clamp means are provided for connecting each of the pegs 57 to the carrying rack and more particularly to a selected one of the longuditinal bars 33. Moreover, mounting of each peg is such that it can be readily moved between a collapsed position generally parallel with its supporting bar into an erected position projecting outwardly for receiving an article thereon. In one desirable arrangement, each of the pegs 57 has on its base end a pintle of relatively small diameter and secured adjacent to the perimeter of the end portion of the peg substantially as shown in FIGS. 6, 9 and 10, such that the intermediate portion of the pintle serves as a semicylindrical bearing engaging associated bar 33 so that the peg can be rockably shifted between a collapsed position as shown in full outline and an erected position as shown in dash outline (FIG. 10). An angular butt ends 59 of the peg seats against the frame bar and orients the peg to extend in a generally outwardly and upwardly divergently angular relation to the frame bar for efficient hook-like article-retaining position when the article-carrying rack is in its pendant, loading relation to the associated vehicle.

Releasably engaging the pintle 58 is a generally U-shaped clamp member 60, which in one desirable form comprises a strip of suitable gauge spring material dimensioned to engage frictionally about the frame bar 33. Overhanging tooth gripper arms 61 on opposite end portions of the clamp 60 retainingly grip the opposite arms of the pintle 58. Normally the clamp 60 tends to spread apart to grip the pintle and thrust it hard, frictionally against the supporting bar 33 while the yoke of the clamp frictionally grips the supporting bar and through the combined gripping and clamping pressure effectively retains the peg in place. Nevertheless, since the toothed grip on the pintle 58 is frictional, the peg can readily be swung with moderate manual effort between its collapsed and erected position as desired. For shifting the peg along the length of the bar 33, the clamp 60 is released by crampingly squeezing its opposite arms to swing toward one another and move them from the pintle 58, substantially as shown in the righthand dot-dash outline in FIG. 10. After sliding adjustment of the peg and clamp assembly or replacement has been effected release of the resilient clamp to reengage the pintle again clamps the peg in place. By substantially the same cramping of the resillient clamp 60 ready assembly of the peg therewith, or disassembly of the peg can be effected, as is apparent. Use of the pegs 57 has been found especially advantageous for hanging articles such as bicycles, and the like, on the carrying rack which in its pendant position may thus serve as a convenient rack for that type of article.

Means are provided to facilitate manipulating the carrying rack 17 between its horizontal carrying position and its pendant overside loading position, in spite of the fact that the vehicle rooftop on which the carrier is mounted is substantially higher than even a moderately tall person, and without need for any step or other elevating device for the benefit of the manipulator. To this end, a manipulating pole 62 (FIGS. 1, 2, 5 and 11) is provided which is attached to the front end of the carrying rack 17 in such a manner that the carrying rack can, after release of the latches 44, be rolled out to whatever extent desired overside relative to the vehicle, or pushed back into its traveling horizontal position, or may be supported on overside overhanging position in canopy relation to the side of the vehicle. In a desirable, simple arrangement, the pole 62 is constructed as a pair of substantially equal length separable or telescopic sections comprising an upper tubular section 62a, and a lower section 62b having at least its upper end telescopically received within the lower end of the upper section and secured as by means of a thumb screw 63 in the extended, erected relationship of the sections. On its lower end, the section 62b, is desirably provided with a substantial diameter foot flange 64.

Attachment of the upper end of the manipulating pole 62 is by flexible connecting means desirably comprising a double leaf hinge 65, one section or leaf of which is secured as by welding to the front lower frame bar 31 in alignment with the center longitudinal frame bar 33 and in depending relation thereto with the other leaf hingedly swingable in a front to rear direction and carrying affixed thereto as by welding a downwardly opening internally threaded socket 67 into which an upper externally threaded end portion 68 of the pole section 62a is screwed in use and from which it may be quickly unthreaded, as desired. To facilitate screwing the section 62a in place or reversely removing the same, a transverse handle-bar 69 is desirably fixedly attached to the lower end portion of the pole section 62a. In the horizontal traveling position of the rack 17 on the base frame 15, the pole 62 may be detached or it may remain in its attached relationship to the rack frame if preferred, and the pole lashed in suitable manner to the side of the vehicle. If the pole is removed, it can be disassembled into sections or the lower section may be telescoped into the upper section and it then affords a small easily stored unit which can be easily erected and screwed into place in the socket 67 for manipulating the rack when desired.

In the use of the pole 62 for pulling the rack 17 from its horizontal traveling position, after the rack has been pulled all the way out, its entire front end weight may be supported by the manipulator through the aid of the pole, and if the weight of the rack, especially when loaded, is too great for the manipulator resting of the foot of the pole on the ground will relieve the burden, and the pole, with the foot flange 64 resting on the ground can then be gradually tilted outwardly, with corresponding downward tilting of the rack 17 until a position is reached whereby lifting the pole up and maintaining outward tension thereon the rack can be permitted to swing gravitationally and with minimum physical effort into the fully pendant loading position thereof. Conversely, when returning the rack 17 from its pendant loading position to the horizontal position, the manipulator may simply swing the rack 17 outwardly and upwardly, permitting the pole 62 to drag until the outer end of the rack has been raised as far as the manipulator desires or reasonably can within the limits of physical ability, and the foot 64 will serve as an anchor to prevent return of the rack until the manipulator can grasp the pole and continue swinging the rack upwardly to a position where return rolling of the rack to its horizontal position may conveniently be effected by manipulation of the pole, and with the supporting rollers 53 affording substantial assistance in this part of the maneuver, especially before the first set of the rollers 40 engages the base frame track.

If the person using the carrier is not permitted the moderate physical exertion involved in manipulating the rack 17 with the aid of the pole 62, the arrangement depicted in FIGURES 12 and 13 may be used, comprising a section pole 70 having an upper section 70a which is arranged to be removably screwed at its upper end into the socket 67 and being provided with a square lower end to receive a manipulating wrench. This section 70a comprises a worm rod telescopically received in a tubular lower section 70b on which is mounted a driving gear 71 operable by means of a permanently attached or removable crank 72 to drive a meshing ring gear 73 which has internal worm threads engaging the worm threads of the shaft section 70a. By turning the gear 71 raising or lowering of the manipulating rod section 70a is thereby effected, and an advantageous worm lock prevails at any position of relative adjustment of the pole sections.

To facilitate shifting of the pole 70 relative to the rack 17 during the raising and lowering maneuver, anti-friction and guide means are provided comprising a wheeled dolly 74 to which the lower end of the lower section 70b of the pole is pivotally attached as by means of a ball and socket or other swivel joint 75. This dolly is guided and runs in a track 77, such as a channel-shaped beam member which is attached at one end of the vehicle such as to the camper 28. For this purpose a plate 78 may be bolted or otherwise secured to the underside of the camper floor, and the end of the track member 77 attached thereto as by means of a pull-out pin 79, which may also serve as a hinge pivot if it is desired to collapse the guide member against the side of the camper when traveling. At its opposite end, the track member 77 has a downwardly extending leg 80 by which it is supported in a generally horizontal position, having a vertically adjustable extension 81 for levelling purposes and which is adapted to be fastened in adjusted position as by means of a thumb screw 82. For collapsing the leg 80 for traveling purposes, it may be attached as by means of a pull-out or pivot pin 83 to the member 70.

In the use of the manipulating pole 70 for drawing the rack 17 out, the pole is attached to the rack while the rack is still in its horizontal traveling position on the base frame, and with the dolly 74 engaged in the track 77. Then by simply pulling outwardly on the post 70, the rack 17 is withdrawn, employing the barest minimum of exertion. Then, to lower the track toward its pendant loading position, the crank 72 is operated to effect downward telescoping of the upper post section 70a into the lower post section 70b, until merely restraint upon precipitate final swinging of the rack into full vertical position will ease it to that position, still with a minimum of physical exertion. For returning the rack to its horizontal position, the rack is swung out from the vehicle and by using the telescoped post 70 as a prying lever, continuation of upward swing of the rack with minimum effort is accomplished until the telescope post is substantially vertical whereupon turning the crank to raise the worm section 70a of the post will complete movement of the rack to its horizontal position. The the rack can be easily returned to registration with the carrier base frame by pushing inwardly on the post 70 which rides substantially frictionlessly on its dolly 74.

Means for covering articles on the rack 17 when desired, and also serving as a canopy or awning, conveniently comprise a roll-awning 84 (FIGS. 1, 3, and 6) of about the same width as the rack and having one end thereof secured about an anchoring rod 85 (FIG. 8) flexibly connected as by means of a plurality of connecting loop members 87 to the upper rear railing bar 34. On this railing bar are carried a spaced pair of upstanding rigid eyelets 88 to which are anchored the opposite ends of a roll-up rope 89 which extends under and around the awning and thereover and is threaded through the eyelets and has a looped end portion which is adapted to be engaged on a cleat 90 mounted on one of the frame bars 30 of the rack. By pulling on the loop of the rope 89, the awning is rolled up about a weighting bar 91 carried by the opposite or free end portion of the awning. In its rolled up condition, the awning 84 occupies a minimum space contiguous to the rear railing of the rack. When the awning 84 is used as a covering for articles on the rack 17, the awning is unrolled until its extended end portion, some of which may still be rolled up about the bar 91, reaches the front railing on the rack to which such end portion of the awning is then lashed in any suitable manner to hold the awning in place as a cover.

Where the awning 84 is to serve as a combination canopy cover and awning, as shown in FIG. 5, it is unrolled, and the rack 17 may be positioned in canopy relation to the side of the vericle with the pole 62 supporting it in that position. Desirably the awning is of length to have a substantial free drop curtain end portion thereof extending downwardly below the front end of the extended rack. If it is not desired to have any portion of the awning depending below the rack, that portion of the awning may be rolled up and engaged within the front railing on the rack.

It may be desired to have the rack 17 in loading position and utilize the awning 84 by itself as a protective canopy, substantially as shown in FIGURES 4 and 14. In that event, supporting means such as a pair of canopy poles 92 may be used, respectively secured to the opposite ends of the bar 91. These support the awning fully stretched out and with suitable guy lines 93 secured either to the bar 91 or to the upper ends of the poles 92 maintaining them in erected condition.

It will be understood that variations and modifications may be effected without departing from the spirit and scope of the novel concepts of this invention.

I claim as my invention:

1. A readily accessible rooftop carrier of the character described, comprising:
    a base frame having means for mounting and retaining it in place on the roof of a vehicle such as a camper or house trailer at such a height above ground level as to require height extension means such as a ladder for a person to reach it;
    a rack comprising a frame substantially matching said base frame in size;
    track means on and extending from end to end of said base frame;
    roller means on said rack riding said track means and enabling the rack to be moved between horizontal article-carrying position above the vehicle and an overside pendant loading position relative to the vehicle;
    and manipulating pole means connected to depend from one end of said rack for moving the rack between said positions by a person standing at ground level, said pole means having a lower ground-engaging end so that the rack can be ground-supported by the pole means in a position between said article-carrying and pendant positions.

2. A carrier as defined in claim 1, including hinge means connecting the pole to the rack and comprising a downwardly extending socket, said pole means and said socket having complementary detachable connecting means whereby the pole means can be attached to the socket or removed from the socket by manipulation by the person standing at ground level while the rack is in said horizontal position.

3. A carrier as defined in claim 1, in which said pole means comprises separable telescopically connected sections.

4. A carrier as defined in claim 3, in which said pole means sections have cooperatively related means for progressively relatively extending or retracting the sections for respectively raising or lowering the rack when moved from said horizontal position into the overside position.

5. A carrier as defined in claim 1, including stop means on said base frame adjacent to said one end of the rack and also adjacent to the opposite end of the rack and confining movement of the rack between said positions, and a vertically movable releasable latch stop plunger on said base frame and readily accessible adjacent to said one end of the rack in said horizontal position thereof and operable between a released lower position and a raised position wherein it is in blocking relation to said roller means for retaining the rack against unintentional displacement from said horizontal position.

6. A carrier as defined in claim 1, in which said rack includes at least one longitudinal bar facing downwardly and spaced inwardly from both oposite sides of the rack, and a supporting roller mounted on said base frame adjacent to said one end of the rack when in said horizontal position and supportingly engaged by said bar which runs therealong in the movement of said rack between said positions.

7. A carrier as defined in claim 1, including at least one longitudinally extending bar intermediate its sides, an article supporting peg, releasable clamping means engaging said bar frictionally and being adjustable longitudinally along the bar, and means pivotally connecting the peg to said clamp enabling the peg to be swung between a collapsed position along said bar into an erected position projecting generally away from said bar to receive and support an article on the rack when the rack is in said overside pendant position.

8. A carrier as defined in claim 1, including a roll awning attached at one end thereof to the opposite end of said rack and adapted to be unrolled over the rack toward said one end.

9. A carrier as defined in claim 8, in which said pole means are constructed and arranged to support the rack in an overhanging outwardly extending relation to the vehicle to serve as a canopy support with the awning unrolled as a canopy top over the rack.

10. A carrier as defined in claim 9, in which said awning is longer than said rack so that in addition to serving as a canopy top, the awning will extend substantially downwardly beyond said one end of the rack to provide a drop curtain portion.

11. A carrier as defined in claim 8, in which said rack has a railing upstanding on its oposite end, said awning being attached to said railing and in its rolled up condition being supported in stored relation along and inside said railing.

12. A carrier as defined in claim 1, including an awning attached at one end to the opposite end of the rack and being adapted to be extended outwardly away from said oposite end when the rack is in said overside loading position, said awning having adjacent to its free end a transverse bar, and supporting post means engageable with said bar for supporting the awning in said extended position.

13. A carrier as defined in claim 1, in which said track means comprise longitudinally extending channel-shaped side bars on the base frame opening inwardly toward one another, transverse connecting bars securing the opposite end portions of said side bars in parallel coexistensive relation, said rack comprising longitudinally extending side frame bars of substantially the same length as said base frame bars and transverse connecting frame bars securing said rack side frame bars in spaced parallel coextensive relation, respective depending pintle brackets rigid with certain of said cross bars of the rack adjacent to the side bars of the rack and having pintles projecting outwardly, and said roller means being carried by said pintles and riding within the channels provided by said base frame side bars.

14. A carrier as defined in claim 1, in which said rack has longitudinally extending frame bars facing downwardly in the horizontal position of the rack, article-supporting pegs and adjustable clamps securing said pegs adjustably longitudinally along said frame bars, supporting roller means on said base frame supportingly engaged by said carrier frame bars to facilitate rolling the rack between said positions, upstanding railing means along said rack at least along its opposite end, and roll-up awning means attached at one end to said railing means and being adapted to be unrolled over said rack as protective cover for articles on the rack and also being adapted to serve as a canopy cover when the rack is extended into overside position relative to the vehicle and supported as a canopy by said pole means, said awning also being adapted to serve as a canopy by itself extended from said opposite end of the rack when the rack is in the pendant loading position, and means for supporting the awning in said extended canopy position.

15. A readily accessible car top carrier of the character described, comprising:
- a base frame having means for mounting and retaining it in place on the roof of a vehicle such as a camper or house trailer at such a height above ground level as to require height extension means such as a ladder for a person to reach it;
- a rack comprising a frame substantially matching said base frame in size;
- track means on and extending from end to end of said base frame;
- roller means on said rack riding said track means and enabling the rack to be moved between horizontal article-carrying position and on overside pendant loading position relative to the vehicle;
- manipulating pole means connected to one end of said rack for moving it between said positions by a person standing at ground level;
- pole track means arranged to extend out from the vehicle adjacent to ground level; and
- anti-friction and guide means on the lower portion of the pole means running along said pole track means.

References Cited

UNITED STATES PATENTS

| | | |
|---|---|---|
| 2,500,650 | 3/1950 | Will. |
| 2,788,791 | 4/1957 | Pospisil et al. |
| 2,806,478 | 9/1957 | Sherbinin. |
| 2,907,077 | 10/1959 | Pugsley. |
| 2,930,051 | 3/1960 | Kampmeier. |
| 3,018,783 | 1/1962 | Tyson. |
| 3,088,475 | 5/1963 | Muhr. |
| 3,192,937 | 7/1965 | Carter. |

KENNETH DOWNEY, *Primary Examiner.*